(12) United States Patent
Fietzek et al.

(10) Patent No.: US 9,630,513 B2
(45) Date of Patent: Apr. 25, 2017

(54) PORTABLE BI-DIRECTIONAL MULTIPORT AC/DC CHARGING CABLE SYSTEM

(71) Applicant: Bayerische Motoren Werke Aktiengesellschaft, Munich (DE)

(72) Inventors: Cliff Fietzek, Woodcliff Lake, NJ (US); Philipp Retsch, Woodcliff Lake, NJ (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 510 days.

(21) Appl. No.: 14/203,857

(22) Filed: Mar. 11, 2014

(65) Prior Publication Data

US 2015/0258902 A1    Sep. 17, 2015

(51) Int. Cl.
| | | |
|---|---|---|
| *B60L 11/18* | (2006.01) | |
| *B60R 16/033* | (2006.01) | |
| *B60L 1/00* | (2006.01) | |
| *B60L 11/14* | (2006.01) | |

(52) U.S. Cl.
CPC ........... *B60L 11/1811* (2013.01); *B60L 1/006* (2013.01); *B60L 11/14* (2013.01); *B60L 11/1805* (2013.01); *B60L 11/1818* (2013.01); *B60L 11/1842* (2013.01); *B60R 16/033* (2013.01); *B60L 2210/30* (2013.01); *B60L 2210/40* (2013.01); *B60L 2230/12* (2013.01); *Y02E 60/721* (2013.01); *Y02T 10/70* (2013.01); *Y02T 10/7005* (2013.01); *Y02T 10/7077* (2013.01); *Y02T 10/7088* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01)

(58) Field of Classification Search
CPC .................................................. B60L 11/1811
USPC ........................................................ 307/9.1
See application file for complete search history.

(56) References Cited

U.S. PATENT DOCUMENTS

| | | | | |
|---|---|---|---|---|
| 2004/0062059 | A1* | 4/2004 | Cheng ................ | B60L 11/1814 363/17 |
| 2013/0063981 | A1* | 3/2013 | Dujic ................. | H02M 1/4233 363/16 |
| 2013/0127244 | A1* | 5/2013 | Handa ................ | B60L 1/00 307/9.1 |

* cited by examiner

*Primary Examiner* — Joseph Chang
(74) *Attorney, Agent, or Firm* — Crowell & Moring LLP

(57) ABSTRACT

A portable, bi-directional multiport AC/DC charging cable system provides bi-directional power flow to and from one or more energy storage cells of a vehicle. The system includes a direct current (DC) input/output cable configured to be coupled to the vehicle and an alternating current (AC) input cable configured to be coupled to an AC power source. The system further includes a power module that is coupled to each of the DC input/output cable and to the AC input cable. The power module has an AC output for providing AC power to an external AC load, and a bi-directional AC/DC converter configured to galvanically isolate the vehicle from each of the AC power source and external AC load.

15 Claims, 2 Drawing Sheets

PORTABLE BI-DIRECTIONAL MULTIPORT AC/DC CHARGING CABLE SYSTEM

FIELD OF THE INVENTION

The present invention relates generally to electric vehicle charging, and more particularly to a portable, bi-directional multiport AC/DC charging cable system.

BACKGROUND OF THE INVENTION

A plug-in hybrid electric vehicle (PHEV) or an electric vehicle (EV) is a vehicle which utilizes rechargeable batteries, or similar energy storage device, that can be restored to full charge by connecting a plug to an external electric power source, e.g., an electric wall socket ("external charging"). A PHEV shares the characteristics of a conventional hybrid electric vehicle in that it has both an electric motor and a combustion engine, and of an all-electric vehicle in that it is equipped with a plug suitable for connecting the vehicle to an electrical grid.

One of the drawbacks associated with PHEVs and EVs is that the options for externally charging such vehicles are typically quite limited. Moreover, unless the vehicle is being driven, the energy being stored by the vehicle can provide no additional benefit to the vehicle's owner.

To that end, there is a need in the art for a system and device which can both broaden the charging options available to PHEVs and EVs, as well as enabling the energy stored in an otherwise parked PHEV or EV to provide additional benefits to the vehicle's owner.

SUMMARY OF THE INVENTION

Disclosed and claimed herein is a portable, bi-directional multiport AC/DC charging cable system for providing bi-directional power flow to and from one or more energy storage cells of a vehicle. In one embodiment, the system includes a direct current (DC) input/output cable configured to be coupled to the vehicle and an alternating current (AC) input cable configured to be coupled to an AC power source. The system further includes a power module that is coupled to each of the DC input/output cable and to the AC input cable. In this embodiment, the power module has an AC output for providing AC power to an external AC load, and a bi-directional AC/DC converter configured to galvanically isolate the vehicle from each of the AC power source and external AC load.

Other aspects, features, and techniques of the invention will be apparent to one skilled in the relevant art in view of the following description of the exemplary embodiments of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE EXEMPLARY EMBODIMENTS

One aspect of the present disclosure is to provide a portable bi-directional multiport (PBDM) AC/DC charging cable system that enables PHEV and EV owners to broaden the options available for externally charging the vehicle, i.e., charging the vehicle from an external power supply, such as a wall outlet connected to an electricity grid.

Another aspect of the disclosure is to provide a PBDM AC/DC charging cable system which enables an otherwise parked PHEV or EV to provide additional benefit of allowing the vehicle's owner to access the vehicle electric storage capacity as a source for backup power, such as during power outages and emergencies. In particular, one or more energy storage cells of the vehicle may provide power, through the PBDM AC/DC charging cable system, to an external AC power load, such as small household electrical appliances, chargers for laptops or cell phones, or any other electrical device that operates within the output power limitations of the PBDM cable. In one embodiment, the PBDM AC/DC charging cable system may particularly enable such capability for vehicles that were not originally manufactured to provide reverse energy flow.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

Figure 1:
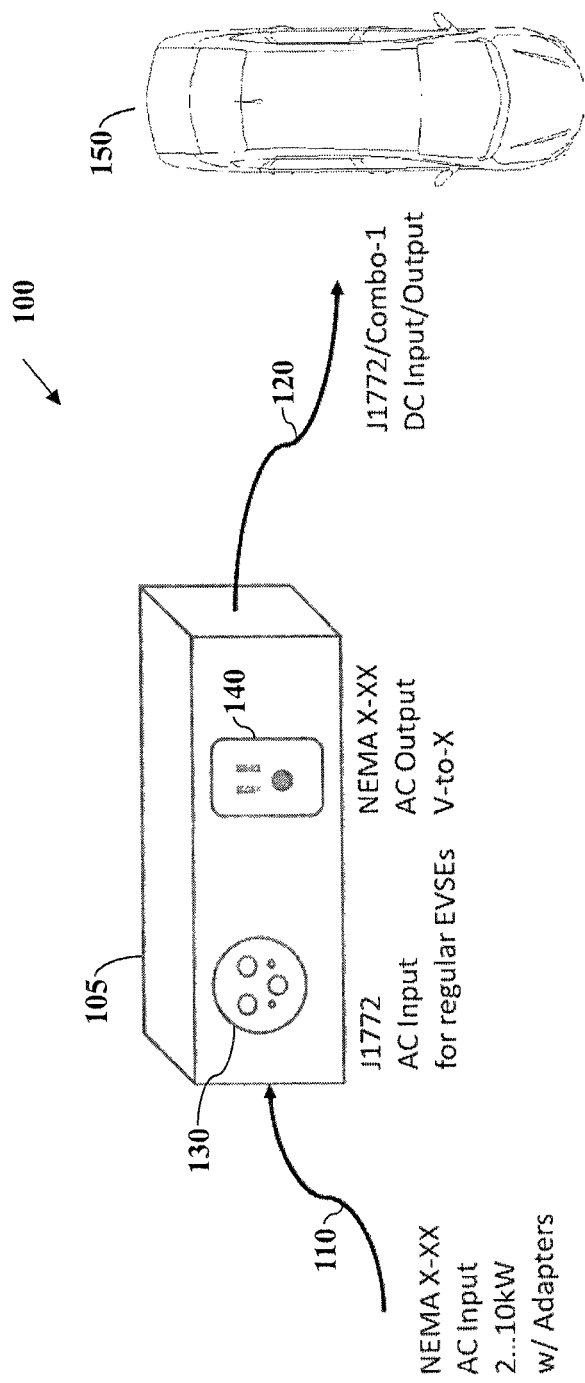
FIG. 1 is a perspective view of a portable bi-directional multiport (PBDM) AC/DC charging cable system, configured in accordance with the principles of the invention.

With reference to FIG. 1, depicted is a PBDM AC/DC charging cable system 100 configured in accordance with the principles of the invention. As shown, the PBDM AC/DC charging cable system 100 comprises a power module 105 which includes a NEMA (National Electrical Manufacturers Association) AC input cable 110, which may comprise one or more adapters (not shown). While in one embodiment the NEMA AC input cable and associated adapter(s) may be rated for between 2-10 kW, it should equally be appreciated that other wattages may similarly be used. The power module 105 is further equipped with an SAE J1722 AC input 130, as shown in FIG. 1. This input 130 may be used for regular EVSE (electric vehicle supply equipment).

With respect to outputs, the power module 105 is equipped with a NEMA AC output 140 configured to provide vehicle-to-infrastructure (v-to-x) AC power. In particular, the NEMA AC output 140 may be used to provide power, originating from the one or more energy storage cells (not shown) to an external AC power load. Depending on the output power limitations, NEMA 5-15r, 5-20r, 6-15r or 6-20r are suitable options for integration into the PBDM cable system 100.

Finally, the power module 105 further comprises an SAE J1772/Combo-Type 1 DC input/output cable 120 which couples a vehicle 150 to the power module 105, and hence to each of the NEMA AC input cable 110, SAE J1722 AC input 130, and NEMA AC output 140. While the intention behind SAE J1772 is primarily charging, the standard and connector do allow for reverse energy flow. Additional details of the power module 105 are set forth below with respect to FIG. 2.

Figure 2:
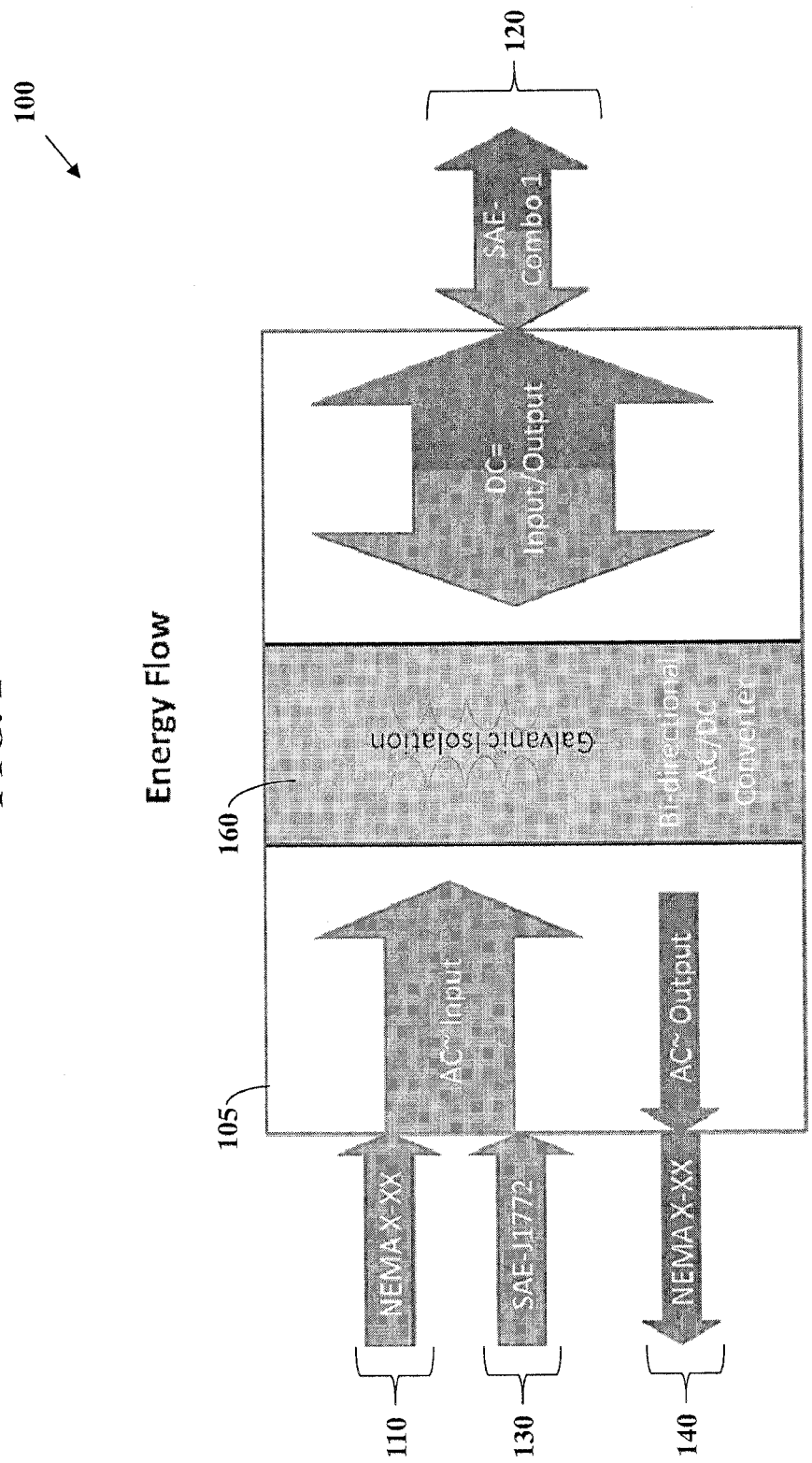
FIG. 2 is a diagram showing the energy flow through the PBDM AC/DC charging cable system of FIG. 1.

Referring now to FIG. 2, depicted is a more detailed embodiment of the power module 105 of the PBDM AC/DC charging cable system 100 of FIG. 1. In particular, FIG. 2 illustrates how energy flows into the power module 105 from the infrastructure side through the NEMA AC input cable 110 and SAE J1722 AC input 130, described above with respect to FIG. 1. Energy flows both into and out of the power module 105 from the vehicle side (e.g., vehicle 150 of FIG. 1) through the J1772/Combo-Type 1 DC input/output cable 120, described above with respect to FIG. 1. Finally, energy may flow out of the power module 105 to the infrastructure side from the aforementioned NEMA AC output 140 for use by an external AC power load, such as small household electrical appliances or chargers for laptops or cell phones, etc.

Continuing to refer to FIG. 2, the power module 105 provides for bi-directional energy flow using a bi-directional AC/DC converter 160 to provide galvanic isolation between the NEMA AC input cable 110, SAE J1722 AC input 130, and NEMA AC output 140, on the one hand, and the J1772/Combo-Type 1 DC input/output cable 120, on the other hand. In certain embodiments, the bi-directional AC/DC converter 160 may comprise an isolation transformer (not shown).

In certain embodiments, the power module 105 may be single phase (120/208/240V) and/or single stage. It should further be appreciated that reverse power flow (i.e., from the vehicle to the infrastructure) may be limited. By way of a non-limiting example, reverse power flow may be limited to 50% of forward power flow.

In various embodiments, features of the power module 105 may include active PFC (Power Factor Correction), bridgeless PFC stage being integrated into the rectifier. Other features of the power module 105 may include active (synchronous) rectification, continuous conduction mode, and zero-voltage-switching. These measures may contribute to increase efficiency and power density, which in turn allow for smaller packaging and better thermal managing.

Due to the concept being SAE J1772 DC charging based, the availability of Power Line Communication (Here: Home Plug Green PHY) allows for integration into a smart home environment. The home energy management (HEM) system can control the charging process based on power load and availability, energy rates, time of day or availability of power generated by renewable sources. The communication interface between the HEM and PBDM AC/DC charging cable may be Ethernet-based, with WiFi or cellular also being acceptable alternatives.

Thus, the PBDM AC/DC charging cable system disclosed herein may enable the electric storage capacity of a PHEV or EV to function as a source for backup power, such as during power outages and emergencies, even though the vehicle may not have been originally manufactured to provide reverse energy flow. In this fashion, more expensive onboard EV chargers may be replaced, while simultaneously providing an inexpensive and simple-to-access emergency power supply.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A portable, bi-directional multiport AC/DC charging cable system for providing bi-directional power flow to and from one or more energy storage cells of a vehicle, the system comprising:
   a direct current (DC) input/output cable configured to be coupled to the vehicle;
   an alternating current (AC) input cable configured to be coupled to an AC power source; and
   a power module, coupled to each of the DC input/output cable and to the AC input cable, and further comprising,
      an AC output, separate from the AC input cable, for providing AC power to an external AC load that is distinct from the AC power source, and
      a bi-directional AC/DC converter configured to galvanically isolate the vehicle from each of the AC power source and external AC load.

2. The bi-directional multiport AC/DC charging cable system of claim 1, wherein the vehicle is one of a plug-in hybrid electric vehicle and an electric vehicle.

3. The bi-directional multiport AC/DC charging cable system of claim 1, wherein the DC input/output cable comprises an interface for coupling to a corresponding vehicle-side interface.

4. The bi-directional multiport AC/DC charging cable system of claim 3, wherein the DC input/output cable interface is a SAE J1772/Combo-Type 1 interface.

5. The bi-directional multiport AC/DC charging cable system of claim 1, wherein the vehicle-side interface is electrically connected to at least one energy storage cell in the vehicle.

6. The bi-directional multiport AC/DC charging cable system of claim 4, wherein the vehicle-side interface is electrically connected to at least one energy storage cell in the vehicle.

7. The bi-directional multiport AC/DC charging cable system of claim 1, wherein the AC input comprises an interface for receiving power from electric vehicle supply equipment.

8. The bi-directional multiport AC/DC charging cable system of claim 6, wherein the AC input comprises an interface for receiving power from electric vehicle supply equipment.

9. The bi-directional multiport AC/DC charging cable system of claim 7, wherein the AC input interface is a SAE J1772 interface.

10. The bi-directional multiport AC/DC charging cable system of claim 8, wherein the AC input interface is a SAE J1772 interface.

11. The bi-directional multiport AC/DC charging cable system of claim 1, wherein the AC output is configured to provide power to an AC load via a NEMA interface.

12. The bi-directional multiport AC/DC charging cable system of claim 10, wherein the power provided by the AC output is vehicle-to-infrastructure power.

13. The bi-directional multiport AC/DC charging cable system of claim 1, wherein the power module further provides bi-directional power to the vehicle via the DC input/output cable.

14. The bi-directional multiport AC/DC charging cable system of claim 10, wherein the power module is further configured to limit power flow from the vehicle as a percentage of power flow to the vehicle.

15. The bi-directional multiport AC/DC charging cable system of claim 1, wherein the bi-directional AC/DC converter comprises an isolation transformer.

* * * * *